United States Patent
Morikawa

(10) Patent No.: US 10,230,854 B2
(45) Date of Patent: Mar. 12, 2019

(54) IMAGE READING APPARATUS, IMAGE FORMING APPARATUS, AND IMAGE FORMING SYSTEM WITH INTERPOLATION OF CORRECTION DATA

(71) Applicant: CANON KABUSHIKI KAISHA, Tokyo (JP)

(72) Inventor: Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/603,641

(22) Filed: May 24, 2017

(65) Prior Publication Data
US 2017/0353613 A1     Dec. 7, 2017

(30) Foreign Application Priority Data
Jun. 1, 2016 (JP) .................. 2016-110142

(51) Int. Cl.
*H04N 1/00* (2006.01)
*H04N 1/60* (2006.01)
(Continued)

(52) U.S. Cl.
CPC ..... *H04N 1/00037* (2013.01); *H04N 1/00602* (2013.01); *H04N 1/00795* (2013.01); *H04N 1/193* (2013.01); *H04N 1/401* (2013.01); *H04N 1/4097* (2013.01); *H04N 1/6008* (2013.01); *H04N 2201/0081* (2013.01)

(58) Field of Classification Search
None
See application file for complete search history.

(56) References Cited

U.S. PATENT DOCUMENTS

| 7,558,437 B2 | 7/2009 | Misaka |
| 7,619,785 B2 | 11/2009 | Sodeura et al. |

(Continued)

FOREIGN PATENT DOCUMENTS

| JP | S62-49765 A | 3/1987 |
| JP | H06-6589 A | 1/1994 |

(Continued)

OTHER PUBLICATIONS

U.S. Appl. No. 15/603,632, filed May 24, 2017 (Inventor: Daisuke Morikawa).

*Primary Examiner* — Thomas D Lee
(74) *Attorney, Agent, or Firm* — Venable LLP

(57) ABSTRACT

An image reading apparatus includes a line sensor configured to read an image of a target object. The line sensor includes light receiving element arrays arranged at given intervals in a second direction perpendicular to a first direction for a plurality of lines, the plurality of light receiving element arrays each including a first light receiving element configured to receive light of a first color and a second light receiving element configured to receive light of a second color different from the first color, which are arranged in the first direction to form one line. The image reading apparatus is configured to derive a shading correction coefficient for shading correction based on output from the light receiving element arrays that have read a reference white plate, and to identify, as an abnormal pixel, a pixel obtained by reading a foreign matter existing on the reference white plate.

11 Claims, 14 Drawing Sheets

(51) Int. Cl.
*H04N 1/193* (2006.01)
*H04N 1/401* (2006.01)
*H04N 1/409* (2006.01)

(56) References Cited

U.S. PATENT DOCUMENTS

| | | | |
|---|---|---|---|
| 8,411,317 B2 | 4/2013 | Morikawa | |
| 2004/0114827 A1* | 6/2004 | Chizawa | G06T 7/0004 |
| | | | 382/274 |
| 2005/0280867 A1* | 12/2005 | Arai | H04N 1/00013 |
| | | | 358/2.1 |
| 2013/0278955 A1* | 10/2013 | Shimatani | H04N 1/4097 |
| | | | 358/1.13 |

FOREIGN PATENT DOCUMENTS

| JP | H08-116402 A | 5/1996 |
|---|---|---|
| JP | 2001-285594 A | 10/2001 |
| JP | 2002359742 A * | 12/2002 |

\* cited by examiner

IMAGE READING APPARATUS, IMAGE FORMING APPARATUS, AND IMAGE FORMING SYSTEM WITH INTERPOLATION OF CORRECTION DATA

BACKGROUND OF THE INVENTION

Field of the Invention

The present invention relates to a shading correction method for an image reading apparatus, and more particularly, to a method of detecting a foreign matter adhering to a reference white plate and interpolating a result of the detection.

Description of the Related Art

A reading sensor, for example, a charge coupled device (CCD) or a complementary metal oxide semiconductor (CMOS), included in an image reading apparatus produces a read image exhibiting variations in reading characteristic for each pixel. In addition, there may occur a mismatch in conversion characteristic, which is called shading, between originally-exhibited luminance of an image and the luminance of the read image due to an influence of non-uniformity of a light amount distribution of a light source configured to illuminate an original in a main scanning direction, a distortion characteristic of a condensing lens, or the like.

In general, shading correction is conducted as a method of correcting such a mismatch regarding the read image so that the entire image exhibits a luminance evenly on average within a plane. The image reading apparatus includes a white reference member (hereinafter referred to as "reference white plate"), which has chromaticity managed properly, as a target object used as a target value of a uniform luminance in the shading correction. At a time of the shading correction, the image reading apparatus reads the reference white plate, and generates correction data (shading correction coefficient) to be used for the shading correction from the read result. However, when dust, a stain, or other such foreign matter adheres to a reading surface of a reference white plate, the shading correction coefficient is generated with the foreign matter being used as a reference, which raises a problem of causing an occurrence of a streak or other such failure in image data subjected to the shading correction.

In view of such a problem, an image reading apparatus described in Japanese Patent Application Laid-open No. 2001-285594 creates a shading correction value based on read data obtained at a first position on the reference white plate, and conducts the shading correction for read data obtained at a second position on the reference white plate, which is different from the first position, through use of the created shading correction value. When the data subjected to the shading correction includes data representing a value indicating luminance larger than that of a shading target value, the image reading apparatus creates the shading correction value based on read data obtained at the second position. The image reading apparatus conducts the shading correction on an image of an original read by a reading unit, based on the shading correction value created in the above-mentioned manner. With this configuration, even when dust adheres to the reference white plate, it is possible to detect a shading position while avoiding the dust, and to achieve satisfactory shading correction.

Color image reading sensors disclosed in Japanese Patent Application Laid-open No. 62-49765 and Japanese Patent Application Laid-open No. 8-116402 are each obtained by arranging a plurality of arrays each including a large number of photoelectric conversion elements arranged in a straight line. The color image reading sensor includes a plurality of line sensors. In the line sensor, each of color filters that corresponds to any one of colors is arranged so as to correspond to each of the photoelectric conversion elements, the color having the same number as the number of arrays of the photoelectric conversion elements. The color filters for a plurality of colors are cyclically arranged in a direction along the line of each of the line sensors, and are also arranged so that the colors of the color filters at the same position in the direction along the line differ from one another over the respective plurality of lines.

For example, a reading sensor having such an arrangement of the color filters (hereinafter referred to as "staggered arrangement") as that employed by the color image reading sensor disclosed in Japanese Patent Application Laid-open No. 62-49765 or Japanese Patent Application Laid-open No. 8-116402 has a feature in that the adjacent photoelectric conversion elements read different colors instead of reading the same color as illustrated in FIG. 17. As illustrated in FIG. 17, one piece of dust is read by the photoelectric conversion elements for the respective colors of red (R), green (G), and blue (B) depending on the size and the position of adhering dust. Therefore, one piece of dust is identified by being apparently separated into a plurality of dust images (dust flags (R), (G), and (B)). In a reading sensor formed so that color filters for the same color are arranged in one line, the adjacent photoelectric conversion elements are configured to read the same color, and hence the above-mentioned phenomenon does not occur. In FIG. 17, the main scanning direction represents a direction perpendicular to a conveyance direction of an original.

In this manner, through use of the reading sensor including the color filters having the staggered arrangement, the dust adhering to the reference white plate is separated into the dust images of different colors. Therefore, when one piece of dust adheres over a plurality of pixels, the dust flag indicating the position of the dust is also separated into dust flags of a plurality of colors. In short, there remains a problem in that the number of pieces of dust may increase by the maximum width of detected dust.

As another example, when one piece of dust having a width of 15 pixels adheres to one line of the reading sensor, the number of detected pieces of dust is 15 times larger as illustrated in FIG. 18. In this manner, when the reading sensor including the color filters having the staggered arrangement is employed, the number of detected pieces of dust increases for each individual piece of dust adhering to the reference white plate to be detected as dust. Therefore, there remains a problem in that a time period required for detection of dust and correction processing for a result of the detection also increases proportionally, which in turn causes a delay in the start of image reading to be conducted after the shading correction.

The present invention has a primary object to provide an image reading apparatus capable of reducing a time period required for detection of dust and interpolation processing for a result of the detection even by including a reading sensor obtained by arranging color filters for at least two colors in one line. The present invention further provides an image forming apparatus including the image reading apparatus and an image forming system including the image reading apparatus.

SUMMARY OF THE INVENTION

An image reading apparatus according to the present disclosure includes a sensor configured to read an image of a target object, the sensor having: a plurality of line sensors, each line sensor including a plurality of light receiving elements aligned in a first direction, the plurality of line sensors being arranged at given intervals in a second direction perpendicular to a first direction, and the light receiving elements including a first light receiving element configured to receive light of a first color and a second light receiving element configured to receive light of a second color different from the first color; an image processor configured to derive correction data for shading correction based on output from the plurality of line sensors that have read a reference white plate; and an identifying unit configured to identify, as an abnormal pixel, a pixel obtained by reading a foreign matter existing on the reference white plate based on the correction data, wherein the image processor is configured to interpolate the correction data for a portion corresponding to the abnormal pixel based on a pixel adjacent to the abnormal pixel.

Further features of the present invention will become apparent from the following description of exemplary embodiments (with reference to the attached drawings).

DESCRIPTION OF THE EMBODIMENTS

Now, a description is made of an exemplary case where the present invention is applied to an image reading apparatus. In order to alleviate a defect of sampling data due to dust, a stain, or other such foreign matter adhering to a reference white plate, an image reading apparatus according to an embodiment of the present invention is configured to conduct detection of the dust adhering to the reference white plate and interpolation processing for a detection result. It is also possible to provide a printer or other such image forming apparatus with a function provided to the image reading apparatus according to the embodiment of the present invention.

First Embodiment

Figure 1:
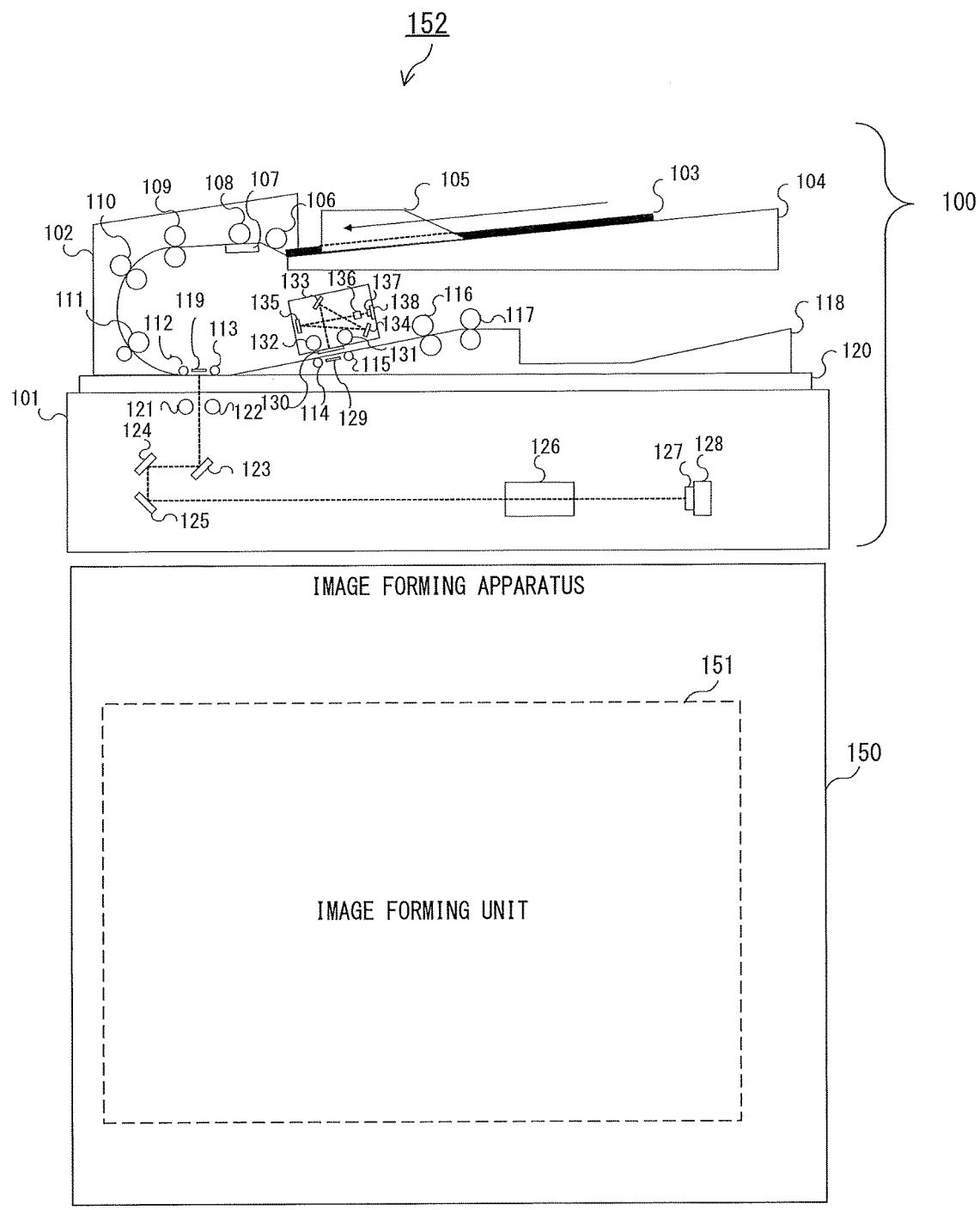
FIG. 1 is a schematic vertical sectional view for illustrating an example of a configuration of an image reading system according to a first embodiment of the present invention.

FIG. 1 is a schematic vertical sectional view for illustrating an example of a configuration of an image forming system according to a first embodiment of the present invention. An image forming system 152 includes an image reading apparatus 100 and an image forming apparatus 150.

The image forming apparatus 150 includes an image forming unit 151 configured to form an image by a known electrophotographic printing method. The image forming unit 151 includes a photosensitive member, an exposure device, a developing device, a transfer unit, and a fixing device. The exposure device is configured to form an electrostatic latent image on the photosensitive member based on read data (image data) generated by the image reading apparatus 100 reading an original 103. The developing device is configured to form a developer image on the photosensitive member by developing the electrostatic latent image formed on the photosensitive member by a developer. The transfer unit is configured to transfer the developer image formed on the photosensitive member onto a given recording medium (for example, a sheet of paper). The fixing device is configured to fix the developer image transferred onto the recording medium to the recording medium. With the above-mentioned configuration, the image forming unit 151 forms an image corresponding to the image data on the recording medium.

The image reading apparatus 100 includes a reader unit 101 configured to read an original and an automatic original feeding device 102 (hereinafter referred to as "auto document feeder (ADF)") configured to convey the original. A configuration of the image reading apparatus 100 is described below in detail.

The original 103 is placed on an original tray 104. Width regulating plates 105 are configured to suppress skew feeding of the original 103 by being brought into abutment with the original 103 placed on the original tray 104. The original 103 is conveyed to a separator by a pickup roller 106. At the separator, the originals 103 are separated sheet by sheet in order from the top of sheets to be conveyed by a separation pad 107 and a separation roller 108.

The separated original 103 is subjected to correction of the skew feeding by first registration rollers 109, and conveyed through second registration rollers 110, first conveyance rollers 111, a second conveyance roller 112, and a third conveyance roller 113 in the stated order. The original 103 being conveyed has a front surface read when passing through a position between a white opposing member (reference white plate) 119 and a reading glass 120. A position for acquiring image information on the front surface of the original 103 is referred to as "first reading position".

The original 103 that has passed through the third conveyance roller 113 is conveyed through a fourth conveyance roller 114 and a fifth conveyance roller 115 in the stated order. The original 103 being conveyed has a back surface read when passing through a position between a white opposing member (reference white plate) 129 and a back surface reading glass 130. A position for acquiring image information on the back surface of the original 103 is referred to as "second reading position". After that, the original 103 is conveyed through sixth conveyance rollers 116 and delivery rollers 117 to be delivered to an original delivery tray 118.

A description is made of an operation for reading the front surface of the original 103. While the original 103 is passing through the position between the white opposing member 119 and the reading glass 120 existing at the first reading position, light sources 121 and 122 apply light to the original 103. The reflected light is guided to an imaging lens 126 by reflective mirrors 123, 124, and 125. The light (reflected light) converged by the imaging lens 126 is imaged onto a line sensor 127 obtained by arranging complementary metal oxide semiconductors (CMOSs) or other such image pickup elements in a line. An optical signal obtained through the imaging is converted into an electric signal by the line sensor 127 and into a digital signal by a signal processing board 128, and is then subjected to image processing.

A description is made of an operation for reading the back surface of the original 103. While the original 103 is passing through the position between the white opposing member 129 and the back surface reading glass 130 existing at the second reading position, light sources 131 and 132 apply light to the original 103. The reflected light is guided to an imaging lens 136 by reflective mirrors 133, 134, and 135. The light (reflected light) converged by the imaging lens 136 is imaged onto a line sensor 137 obtained by arranging CMOSs or other such image pickup elements in a line. An optical signal obtained through the imaging is converted into an electric signal by the line sensor 137 and into a digital signal by a signal processing board 138, and is then subjected to image processing. In this manner, each line sensor is configured to read an image of a target object (for example, original 103 or reference white plate 119 or 129).

It is general to employ a configuration using a reading unit in common both in a case of reading the front surface of the original 103 by a flow reading operation for reading an image while conveying the original 103 and a case of a platen reading operation for reading the original 103 placed on the reading glass 120. In the platen reading operation, the light sources 121 and 122 and the reflective mirror 123 are moved in a direction from the left to the right of FIG. 1, to thereby enable the line sensor 127 to read the image of the original 103 placed on the reading glass 120.

Meanwhile, a unit configured to read the back surface of the original 103 in the flow reading does not need to be moved, and is therefore mounted by being fixed to a casing of the ADF 102.

Configuration of Controller of Image Reading Apparatus

Figure 2:
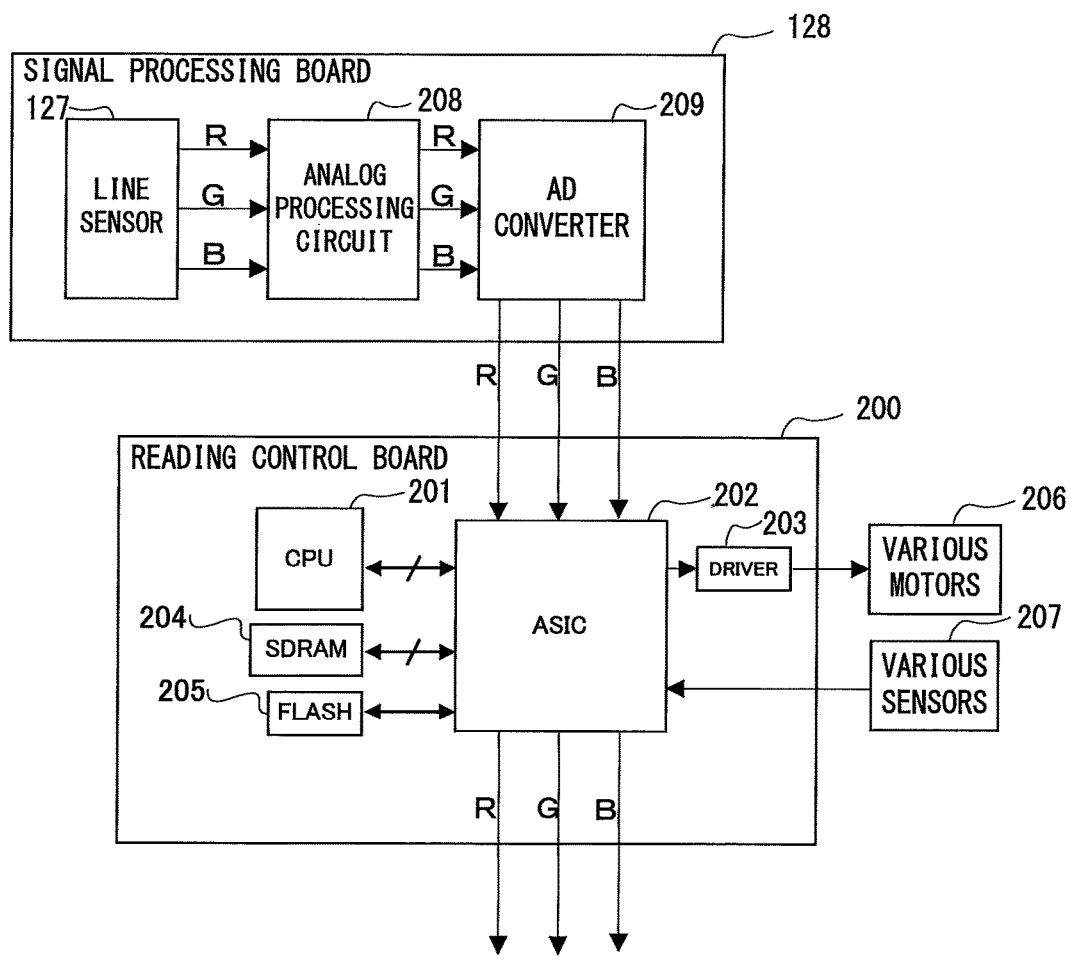
FIG. 2 is a block diagram for illustrating an example of a functional configuration of an image reading apparatus according to the first embodiment.

FIG. 2 is a block diagram for illustrating an example of a functional configuration of the image reading apparatus 100. The image reading apparatus 100 includes a reading control board 200 and the signal processing board 128.

The signal processing board 128 includes the line sensor 127, an analog processing circuit 208, and an analog-to-digital converter (AD converter) 209. The line sensor 137 is also provided on the signal processing board 138 having the same configuration, but an illustration thereof and a description thereof are omitted herein.

The analog processing circuit 208 is configured to conduct analog processing, for example, adjustment of an offset value or a gain value, on an analog signal photoelectrically converted by the line sensor 127. The AD converter 209 is configured to convert the analog signal processed by the analog processing circuit 208 into a digital signal. A converted digital image signal is input to an image processing application specific integrated circuit (ASIC) 202.

The reading control board 200 includes a central processing unit (CPU) 201, the image processing ASIC 202, a motor driver ("DRIVER" in FIG. 2) 203, a synchronous dynamic random access memory (SDRAM) 204, and a flash memory ("FLASH" in FIG. 2) 205. An input signal from each of various sensors 207 (not shown in FIG. 1) included in the image reading apparatus 100 is input to the image processing ASIC 202 or the CPU 201. A control output signal to each of various motors 206 (not shown in FIG. 1) is output from the image processing ASIC 202 or the CPU 201.

The CPU 201 makes various operation settings or the like for the image processing ASIC 202. The image processing ASIC 202 receives the settings and then executes various kinds of image processing on the digital image signal input from the AD converter 209. The image processing ASIC 202 exchanges various control signals and the image signal with the SDRAM 204 as well in order to temporarily store the image signal at a time of the image processing, for example. The image processing ASIC 202 stores a part of image processing parameters and various setting values for the image processing ASIC 202 in the flash memory 205 to read and use the stored data and parameters as the need arises.

The image processing ASIC 202 starts the image processing or outputs control pulses for the various motors 206 to the motor driver 203 with a trigger of an instruction issued from the CPU 201 or input of a sensor signal, to thereby execute a series of image reading operations. Image data subjected to the various kinds of image processing by the image processing ASIC 202 is passed to a main control board (not shown) in the subsequent stage.

Configuration of Reading Sensor

Figure 3A:
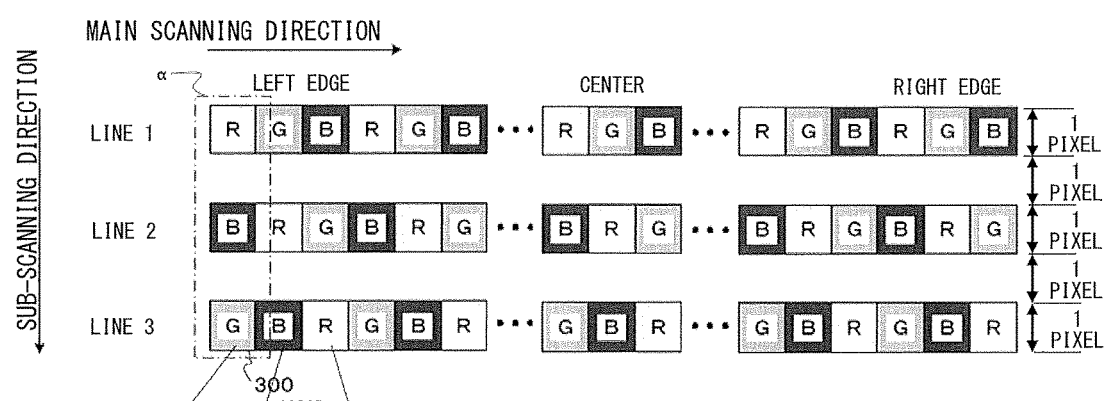
FIG. 3A, FIG. 3B, and FIG. 3C are diagrams for illustrating an example of a configuration of a line sensor being a reading sensor.
Figure 3B:
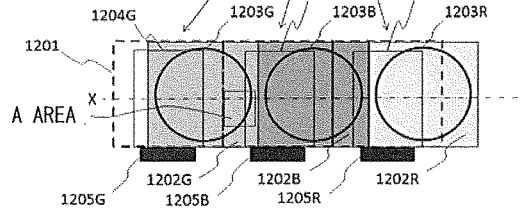
Figure 3C:
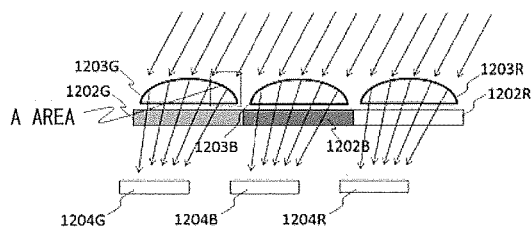

FIG. 3A, FIG. 3B, and FIG. 3C are diagrams for illustrating an example of a configuration of each of the line sensors 127 and 137 being reading sensors. The line sensors 127 and 137 have the same configuration.

As illustrated in FIG. 3A, the line sensors 127 and 137 each include a light receiving element array obtained by arranging photodiodes 1204 in a direction (hereinafter referred to as "main scanning direction") perpendicular to a conveyance direction of the original 103 and a plurality of color filters 1202 (light transmitting units) arranged so as to correspond to the light receiving element array.

As illustrated in FIG. 3B, the photodiode 1204 for one pixel is formed to be smaller than a color filter 1202 for one pixel corresponding to the photodiodes 1204. The line sensors 127 and 137 also each include a plurality of light receiving element arrays obtained by arranging a line 1, a line 2, and a line 3 in the conveyance direction (hereinafter referred to as "sub-scanning direction") of the original 103. An insulating material (not shown), for example, SiO, which is called "interlayer film", exists between the color filter 1202 and the photodiodes 1204.

As illustrated in FIG. 3C, a micro lens 1203 (light condensing unit) is arranged on the opposite side to the photodiodes 1204 across the color filter 1202. The micro lens 1203 is arranged so as to correspond to the photodiode 1204, and has a function of condensing light to be emitted onto the photodiode 1204. A cover glass (not shown) is arranged above the micro lens 1203.

A gate electrode 1205 is a gate electrode (charge transfer unit) of a pixel transfer transistor, and plays the role of reading photocharges accumulated in the photodiode 1204 and transferring the photocharges to a circuit. The gate electrode 1205 is formed of, for example, polysilicon.

The main scanning direction in which the light receiving elements are arranged in a line is set as a first direction, and the sub-scanning direction perpendicular to the main scanning direction is set as a second direction. An array formed of the light receiving element array in the first direction is referred to as "line". One line is formed of one light receiving element array. In each of the line sensors 127 and 137, a plurality of lines of the light receiving element arrays each forming one line are arranged at given intervals in the second direction perpendicular to the first direction.

In the respective lines 1, 2, and 3 being the light receiving element arrays, the photodiodes 1204 are arranged so as to include 7,500 pixels in the main scanning direction and three rows in the sub-scanning direction. In the first embodiment, a resolution in the main scanning direction is assumed to be 600 dpi. The respective light receiving element arrays are arranged with a gap of one pixel in the sub-scanning direction. Therefore, the line 2 is configured to acquire an image at a position spaced apart from the line 1 by two pixels in the sub-scanning direction. The line 3 is configured to acquire an image at a position spaced apart from the line 1 by four pixels in the sub-scanning direction.

As the color filters 1202, there are used three kinds of color filters configured to transmit light in different wavelength regions. The three kinds of color filters include a filter 1202R configured to transmit red light, a filter 1202G configured to transmit green light, and a filter 1202B configured to transmit blue light.

As illustrated in FIG. 3A, the color filters 1202 in the line 1 are arranged with cyclic regularity of R→G→B→R→G→B→ . . . in the main scanning direction. The color filters 1202 in the line 2 are arranged with cyclic regularity being shifted from the cyclic regularity of R→G→B→ . . . in the line 1 by one pixel in the main scanning direction. The color filters 1202 in the line 3 are arranged with cyclic regularity being shifted from the cyclic regularity of R→G→G→ . . . in the line 1 by two pixels in the main scanning direction. Therefore, the color filters for R, G, and B exist in the respective lines when the arrangement of the color filters 1202 are viewed in the sub-scanning direction (see the area α in FIG. 3A). In this manner, in the lines 1, 2, and 3, the color filters 1202 for R, G, and B are arranged in a so-called staggered shape. A broken line 1201 indicates a range representing a unit pixel. The unit pixels have a pitch determined by specifications of a CMOS sensor, and generally employ regular intervals.

In this manner, the line sensors 127 and 137 each include the light receiving element array obtained by arranging a plurality of first light receiving elements each configured to receive light of a first color, a plurality of second light receiving elements each configured to receive light of a second color different from the first color, and a plurality of third light receiving elements each configured to receive light of a third color different from the first color and the second color in a given direction to form one line. The line sensors 127 and 137 are also each formed of a plurality of lines including a first line extending in the first direction (main scanning direction) and at least a second line and a third line that are provided so as to be spaced apart from the first line by a given distance in the second direction (sub-scanning direction) perpendicular to the first direction. The line sensors 127 and 137 are each arranged so that light receiving elements configured to receive light of the same color are not adjacent to each other.

Therefore, in the image data read by the line sensors 127 and 137 which is initially obtained by the light receiving element array, the pixels corresponding to R, G and B in the read data are mixed and are not sorted. For each light receiving element array, each image data of R, G and B, which is read by the line sensors 127 and 137, is associated with relative position information between the image data and other image data and stored. It is noted that "relative position information" means a position of each of the light receiving element of the respective line sensors 127 and 137. In the image data read by the light receiving element array of the respective line sensors 127 and 137, pixels are sorted in the image processing ASIC 202, based on the relative position information, such that the pixels having the same color are adjacently positioned and aligned to obtain pixel arrays consisting of the same color.

Configuration of Shading Corrector

Figure 4:
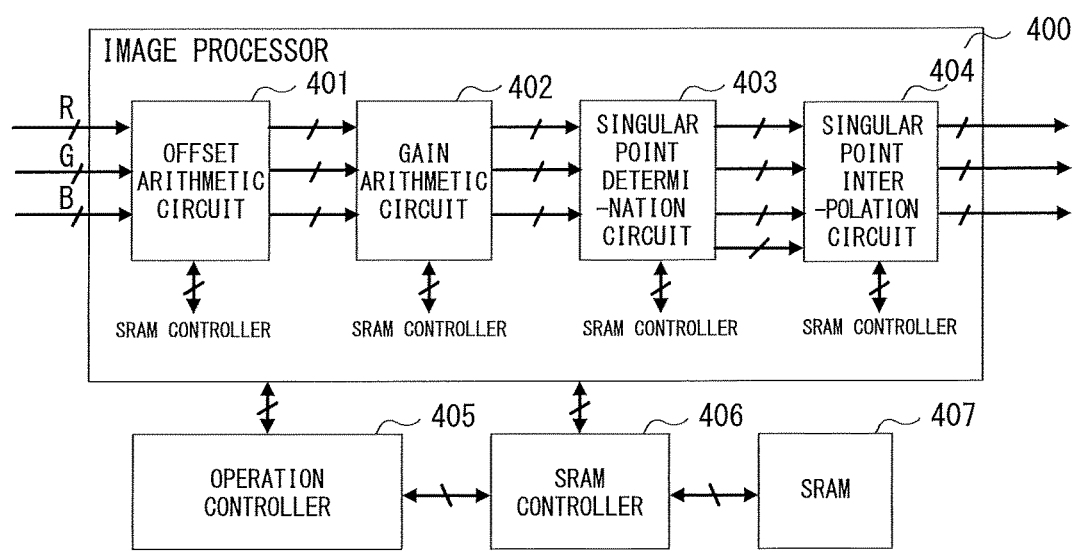
FIG. 4 is a block diagram for illustrating a functional configuration of an image processor configured to execute shading correction processing among functional units of an image processing ASIC.

FIG. 4 is a block diagram for illustrating a functional configuration of an image processor configured to execute shading correction processing among functional units of the image processing ASIC 202. An image processor 400 includes an offset arithmetic circuit 401, a gain arithmetic circuit 402, a singular point determination circuit 403, and a singular point interpolation circuit 404. The image processor 400 is configured to derive correction data for shading correction based on output from the light receiving element arrays of the respective line sensors 127 and 137 that have read the reference white plates 119 and 129.

The offset arithmetic circuit 401 is configured to correct variations in output from the line sensors 127 and 137 under a dark state for the respective pixels.

The gain arithmetic circuit 402 is configured to correct pixel variations in output from the line sensors 127 and 137 under a bright state on which light distribution of the light sources 121, 122, 131, and 132 in the main scanning direction, reduction of a light amount in a peripheral portion ascribable to the imaging lenses 126 and 136, and the like are superimposed.

The singular point determination circuit 403 is configured to compare the read image to a given determination threshold value, and to identify a pixel that exceeds or falls below a threshold value as a singular point pixel (hereinafter referred to as "abnormal pixel").

The singular point interpolation circuit 404 is configured to receive information on a determination result obtained by the singular point determination circuit 403, and to interpolate the correction data for the abnormal pixel identified by the singular point determination circuit 403 by a given method. This is described later in detail.

An operation controller 405 is configured to turn on and off the respective arithmetic circuits for various arithmetic operations within the image processor 400, to set various parameters therefor, to make operation settings for a static random access memory (SRAM) controller 406, and to conduct other such processing.

The SRAM controller 406 is configured to execute data write and data read to/from an SRAM 407 included in the image processing ASIC 202 based on an instruction issued through the operation controller 405.

The various arithmetic circuits within the image processor 400 are also connected to the SRAM controller 406, and are configured to read the offset value, the gain value, a dust determination threshold value, and the like for each pixel, which are stored in the SRAM 407, from the SRAM 407 as the need arises, and to execute a necessary arithmetic operation.

The offset arithmetic circuit 401 is configured to subtract data within the SRAM 407, which stores the offset value, from an input image signal for every pixel in the main scanning direction based on Expression (1).

$$O\_DATA[x]=I\_DATA[x]-BW\_RAM\_DATA[x] \qquad \text{Expression (1)}$$

In Expression (1), x represents a main scanning position, O_DATA represents output data from the image processor 400, I_DATA represents input data to the image processor 400, and BW_RAM_DATA represents data within the SRAM 407 which stores the offset value. The data BW_RAM_DATA is obtained by sampling and adding up the AD-converted output data from the line sensors 127 and 137 under the dark state for every pixel over a plurality of lines, and averaging results thereof by the number of lines used for acquiring the results. BW_RAM_DATA is obtained by Expression (2).

$$BW\_RAM\_DATA[x]=Avg[x]-BW\_TARGET \qquad \text{Expression (2)}$$

Avg[x]: average value of added sampling data

In Expression (2), BW_TARGET represents a target value of the output data under the dark state. In this manner, in the processing conducted by the offset arithmetic circuit 401, non-uniformity among pixels is eliminated from a dark portion side (side exhibiting a smaller luminance value) of the input image data.

The gain arithmetic circuit 402 is configured to multiply data within the SRAM 407, which stores the gain value, to an input image signal for every pixel in the main scanning direction based on Expression (3).

$$O\_DATA[x]=I\_DATA[x]*WH\_RAM\_DATA[x] \qquad \text{Expression (3)}$$

In Expression (3), x, O_DATA, and I_DATA have the same meanings as those of Expression (1). WH_RAM_DATA represents data within the SRAM 407 which stores the gain value. The data WH_RAM_DATA is obtained by sampling and adding up the AD-converted output data from the line sensor 127 under the bright state for every pixel over a plurality of lines, and averaging results thereof by the number of lines used for acquiring the results. WH_RAM_DATA is obtained by Expression (4).

$$WH\_RAM\_DATA[x]=SHD\_TARGET/Avg[x] \qquad \text{Expression (4)}$$

Avg[x]: average value of added sampling data

In Expression (4), SHD_TARGET represents a target value of the shading correction. In this manner, in the processing conducted by the gain arithmetic circuit 402, non-uniformity among pixels is eliminated from a bright portion side (side exhibiting a larger luminance value) of the input image data.

The singular point determination circuit 403 executes an arithmetic operation for comparing the input image signal to a threshold value (dust (singular point) determination threshold value) for every pixel in the main scanning direction.

A comparison is conducted between I_DATA[x] and OVER_TH[x].

$$I\_DATA[x]>OVER\_TH[x] \qquad \text{Expression (5-1)}$$

$$I\_DATA[x]\leq OVER\_TH[x] \qquad \text{Expression (5-2)}$$

When Expression (5-1) is satisfied, the singular point determination circuit 403 sets OVER_FLAG to "1" (OVER_FLAG=1). When Expression (5-2) is satisfied, the singular point determination circuit 403 sets OVER_FLAG to "0" (OVER_FLAG=0).

A comparison is conducted between I_DATA[x] and UNDER_TH[x].

$$I\_DATA[x]<UNDER\_TH[x] \qquad \text{Expression (6-1)}$$

$$I\_DATA[x]\geq UNDER\_TH[x] \qquad \text{Expression (6-2)}$$

When Expression (6-1) is satisfied, the singular point determination circuit 403 sets UNDER_FLAG to "1" (UNDER_FLAG=1). When Expression (6-2) is satisfied, the singular point determination circuit 403 sets UNDER_FLAG to "0" (UNDER_FLAG=0).

In each of the above-mentioned expressions, x and I_DATA have the same meanings as those of Expression (1). OVER_TH and UNDER_TH each represent a singular point determination threshold value. As described above, OVER_FLAG=1 is established when the input data is relatively larger than OVER_TH, and UNDER_FLAG=1 is established when the input data is relatively smaller than UNDER_TH.

The singular point determination threshold value can be set equal for all the pixels, but may be changed for each pixel. It is possible to conduct more precise determination corresponding to pixel variations by changing the singular point determination threshold value for each pixel. As a method of changing the singular point determination threshold value for each pixel, there is a method of storing, in the SRAM 407, data on each pixel which is the premise of the singular point determination threshold value and setting the singular point determination threshold value based on the data on each pixel and given luminance. For example, when pieces of data stored in the SRAM 407 at the main scanning position x=10 and 11 are "180" and "185", the singular point determination circuit 403 sets upper limit threshold values of the singular point determination threshold value to "190" and "195", respectively, and sets lower limit threshold values thereof to "170" and "175", respectively. In this manner, in the processing conducted by the singular point determination circuit 403, a singular point of the input image data is identified.

The singular point interpolation circuit 404 monitors continuity of pixels (abnormal pixels) determined as singular points based on the determination result obtained by the singular point determination circuit 403. The singular point interpolation circuit 404 executes the interpolation processing on an abnormal pixel portion when the continuity is interrupted, that is, when the "width" of the singular points is determined. As a method for the interpolation processing, for example, there are a method of simply replacing the abnormal pixel portion by data on adjacent pixels that are not the abnormal pixels and a method of linearly interpolating the abnormal pixel portion by pixel data on at least two pixels that are not the singular points but are peripheral pixels around a singular point area based on a continuous width of the singular points. Any one of the above-mentioned methods may be selectively employed depending on the pixel width of the singular point.

For example, the interpolation processing may be selectively employed so that the linear interpolation of peripheral pixels is conducted when the abnormal pixel width is smaller than or equal to ten pixels while the simple replacement is conducted when the abnormal pixel width exceeds ten pixels. According to the processing conducted by the singular point interpolation circuit 404, data obtained by removing the singular point from the input image data can be acquired.

Shading Correction Processing

Figure 5:
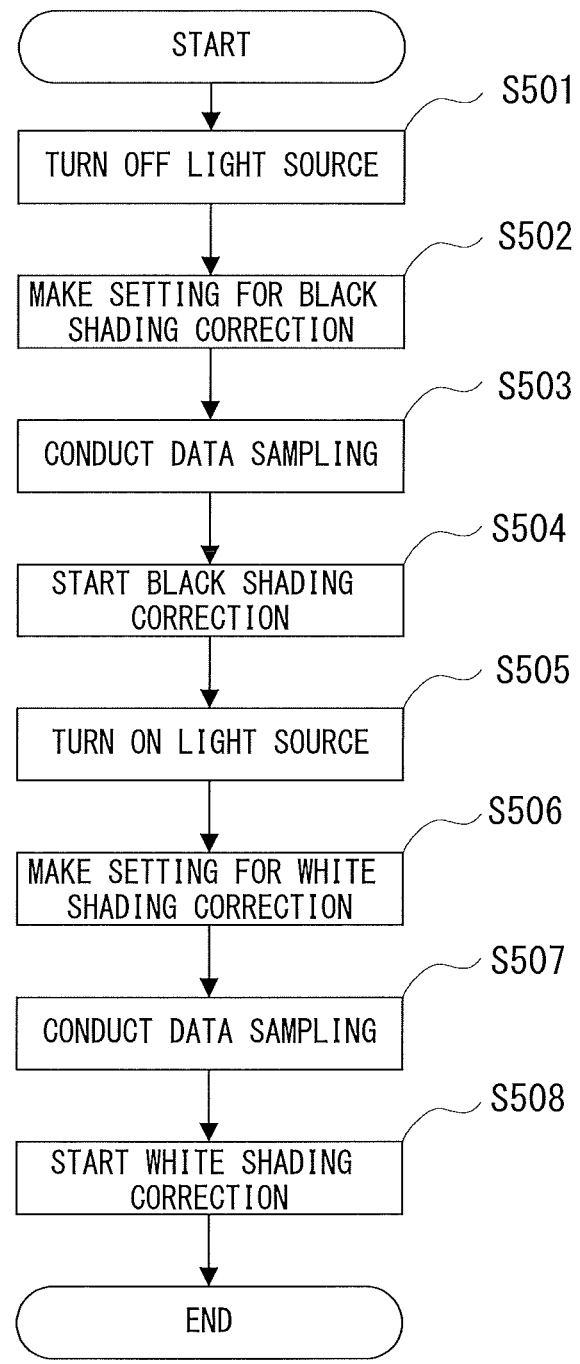
FIG. 5 is a flowchart for illustrating an example of a processing procedure for the shading correction processing conducted by the image reading apparatus.

FIG. 5 is a flowchart for illustrating an example of a processing procedure for shading correction processing conducted by the image reading apparatus 100. Each piece of processing described below is executed mainly by the CPU 201. In a processing procedure for normal shading correction, processing involving the singular point determination circuit 403 or the singular point interpolation circuit 404 illustrated in FIG. 4 is not conducted.

The CPU 201 turns off the light sources (Step S501). Specifically, the CPU 201 turns off the light sources 121 and 122 for a first reader or the light sources 131 and 132 for a second reader. The CPU 201 controls the operation controller 405 to make settings for black shading correction (Step S502). Specifically, the CPU 201 makes settings (processing skipping settings) for allowing none of the offset arithmetic circuit 401, the gain arithmetic circuit 402, the singular point determination circuit 403, and the singular point interpolation circuit 404 to execute their processing.

The CPU 201 conducts data sampling for generating a correction coefficient (correction data) to be used for the black shading correction (Step S503). Specifically, the CPU 201 stores the output data from the singular point determination circuit 403 in the SRAM 407 based on the settings made in the processing of Step S502. The image processing ASIC 202 converts the data stored in the SRAM 407 based on Expression (2), and sets the data obtained after the conversion as a black shading correction coefficient.

The CPU 201 executes the black shading correction on the input data based on the correction coefficient (correction data) to be used for the black shading correction, which is generated in the processing of Step S503 (Step S504). Specifically, the CPU 201 acquires the image data obtained by the image processing ASIC 202 executing the black shading correction from the input image data and the data stored in the SRAM 407, based on Expression (1).

The CPU 201 turns on the light sources turned off in the processing of Step S501 (Step S505). The CPU 201 controls the operation controller 405 to make settings for white shading correction (Step S506). Specifically, the CPU 201 makes settings (processing skipping settings) for allowing the offset arithmetic circuit 401 to execute its processing and for not allowing the other circuits (gain arithmetic circuit 402, singular point determination circuit 403, and singular point interpolation circuit 404) to execute their processing.

The CPU 201 conducts data sampling for generating a correction coefficient (correction data) to be used for the white shading correction (Step S507). Specifically, the CPU 201 stores the output data from the singular point determination circuit 403 in the SRAM 407 based on the settings made in the processing of Step S506. The CPU 201 controls the image processing ASIC 202 to convert the data stored in the SRAM 407 based on Expression (4), and set the data obtained after the conversion as a white shading correction coefficient.

The CPU 201 executes the white shading correction on the input data based on the correction data to be used for the white shading correction, which is generated in the processing of Step S507 (Step S508). Specifically, the CPU 201 acquires the image data obtained by the image processing ASIC 202 executing the white shading correction from the input image data and the data stored in the SRAM 407 based on Expression (3).

Detection of Dust on White Plate and Correction

Now, a description is made of detection of the dust adhering to the reference white plate 119 and the interpolation processing for the detection result, which are conducted in order to alleviate the defect of the sampling data due to the dust, the stain, or other such foreign matter adhering to the reference white plate 119. The detection of the dust and the interpolation processing for the detection result are also conducted for the reference white plate 129 in the same manner.

Figure 6:
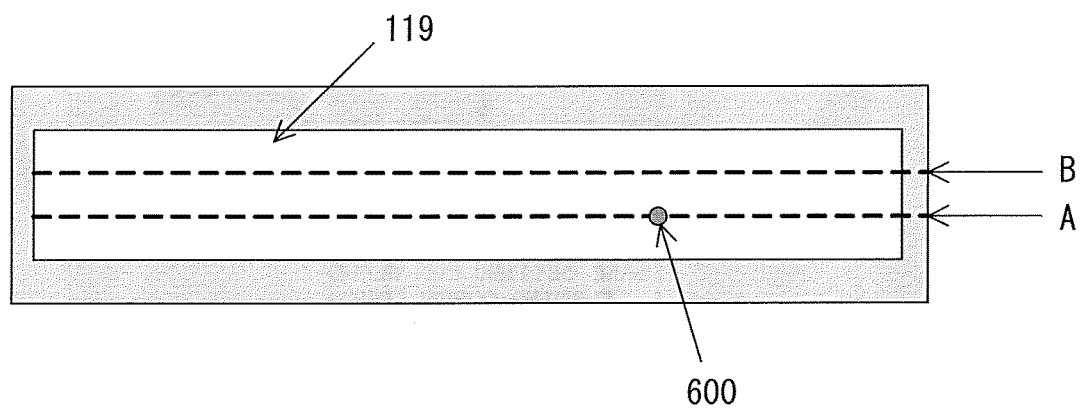
FIG. 6 is an exemplary diagram for illustrating dust adhering to a reference white plate.

FIG. 6 is an exemplary diagram for illustrating dust adhering to the reference white plate 119. In FIG. 6, reading positions on the reference white plate 119 used in an operation for the dust detection are expressed as a line A and a line B. The line B is a position for starting the data sampling for the shading correction for the first time. The line A is a position for the data sampling which is originally set for the shading correction. A processing procedure for the dust detection conducted in this case is described below with reference to FIG. 7 on the assumption that dust 600 adheres to the line A being a shading position.

Figure 7:
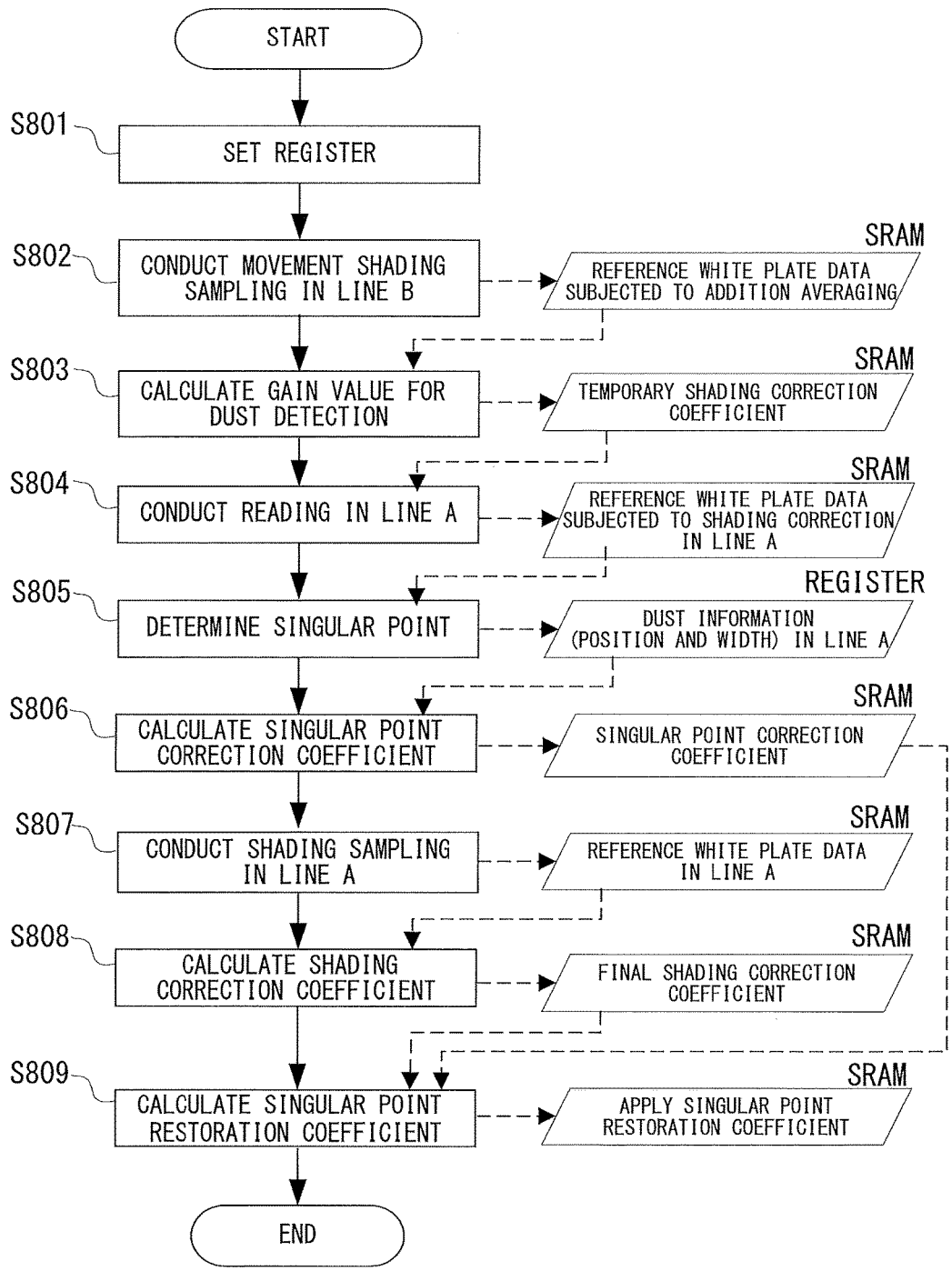
FIG. 7 is a flowchart for illustrating an example of a processing procedure for detection processing for the dust adhering to the reference white plate and correction processing for a detection result.

FIG. 7 is a flowchart for illustrating an example of a processing procedure for detection processing for the dust 600 adhering to the reference white plate 119 and correction processing for a detection result. Each piece of processing described below is executed mainly by the CPU 201. In FIG. 7, it is indicated by the broken line arrow how data is exchanged with the SRAM 407 of the image processing ASIC 202 or a register of an image processing module involved in the execution of each piece of processing.

The CPU 201 sets registers for the image processing module of the image processing ASIC 202 for executing the data sampling and for a load control module configured to supply a pulse to a motor or other such driving part (not shown) configured to move the reading unit in the reading direction (Step S801).

The CPU 201 samples the data for the shading correction while moving the reading unit toward the line A starting from the position of the line B (Step S802). In the processing of Step S802, the sampling results are added up for each pixel over a range of a plurality of lines. The added sampling results (reference white plate data subjected to addition averaging) are stored in the SRAM 407 included in the image processing ASIC 202. The above-mentioned processing is hereinafter referred to as "movement shading". The movement shading is executed in order to obtain a sample which is not affected by the dust 600 for the calculation of the shading correction coefficient and which serves as a comparison target for stricter restoration. The reference white plate 119 is read over a plurality of lines, and pieces of data obtained through the reading are sampled, to thereby reduce the influence of the dust 600.

The CPU 201 calculates a gain value for dust detection based on the data stored in the SRAM 407 in the processing of Step S802 (Step S803). A result of the calculation is stored in the SRAM 407 as a temporary shading correction coefficient. The temporary shading correction coefficient is used to interpolate a correction coefficient for a pixel having the shading correction coefficient determined to be "abnormal" due to the dust 600 in a later processing step.

Figure 8:
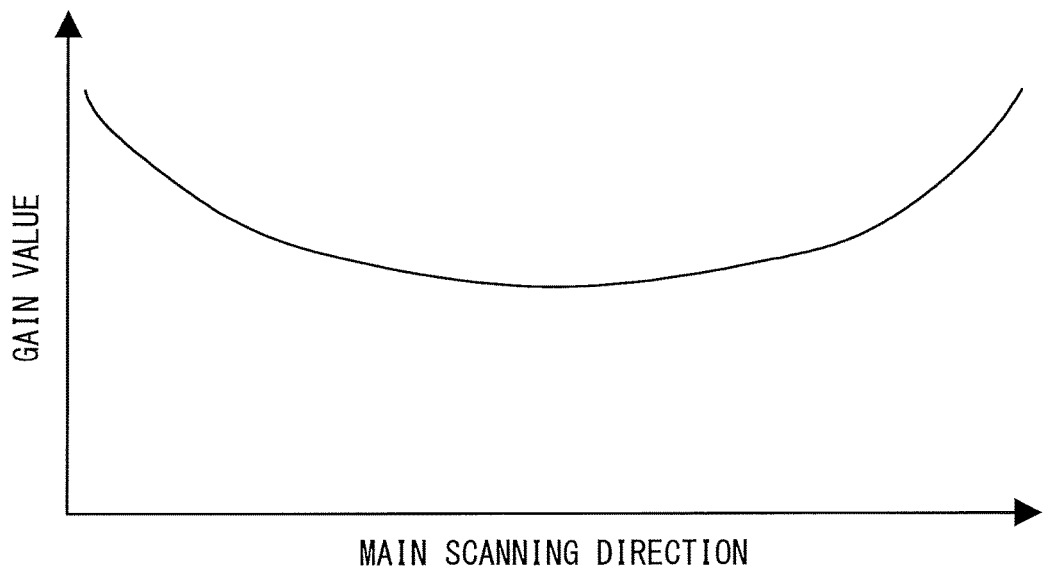
FIG. 8 is a graph for showing an example of a shading correction coefficient obtained through movement shading.

FIG. 8 is a graph for showing an example of the shading correction coefficient obtained through the movement shading. In the graph of FIG. 8, the horizontal axis represents the main scanning direction, and the vertical axis represents the gain value. The gain value is plotted for each of pixels along the main scanning direction.

The description is continued with reference again to FIG. 7. The CPU 201 reads the reference white plate 119 at the position of the line A (Step S804). The CPU 201 controls the image processing ASIC 202 to conduct the shading correction on the read image data through use of the temporary shading correction coefficient calculated in the processing of Step S803, and stores its result (reference white plate data subjected to the shading correction in the line A) in the SRAM 407.

The same reference white plate 119 is read in the above-mentioned processing, and hence a reading result thereof is ideally equal to SHD_TARGET (target value of the shading correction) within Expression (4). However, the dust 600 exists in the line A on the reference white plate 119 as illustrated in FIG. 6, and hence the reading result is expressed as described below with reference to FIG. 9.

Figure 9:
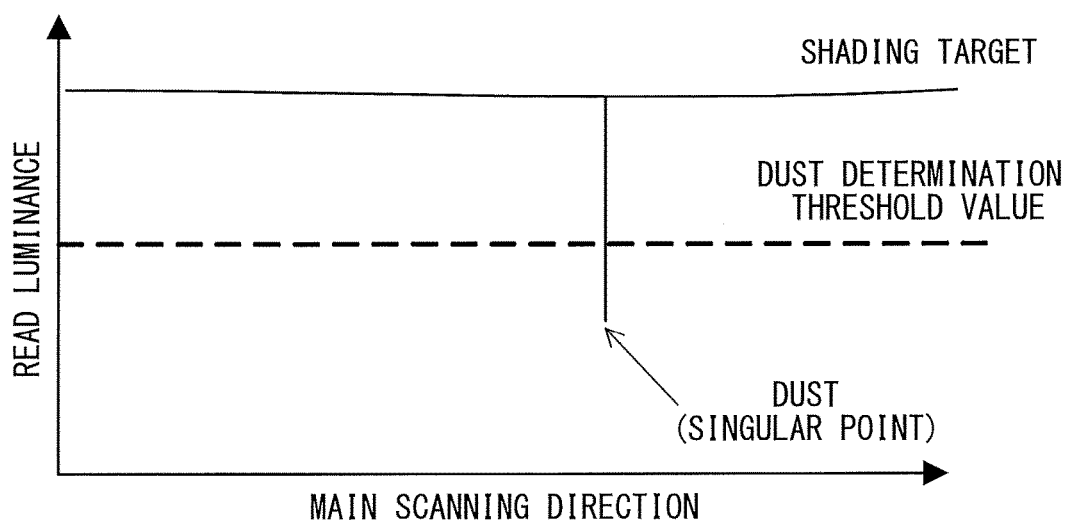
FIG. 9 is a graph for showing an example of a reading result obtained when dust exists in a line A.

FIG. 9 is a graph for showing an example of a reading result obtained when dust 600 exists in the line A. In the graph of FIG. 9, the horizontal axis represents the main scanning direction, and the vertical axis represents read luminance. The pixel in the line A to which the dust 600 adheres has read luminance much smaller than that of any other pixel (shading target value).

The description is continued with reference again to FIG. 7. The CPU 201 identifies the position of the pixel (abnormal pixel) being the dust (singular point) from the data (image data read in the line A) stored in the SRAM 407 in the processing of Step S804 (Step S805). It is noted that, in the singular point determination in Step S805, the logical OR operation among a plurality of colors, which is described below, is performed.

Specifically, as shown in FIG. 9, the CPU 201 controls the image processing ASIC 202 to define a randomly-selected luminance value as the dust determination threshold value and, when the read luminance value falls below a determination threshold value, identify the relevant pixel as a dust pixel. The image processing ASIC 202 may define two dust determination threshold values and identify a pixel exceeding the determination threshold value or a pixel falling below the determination threshold value as the dust. For example, when the dust 600 adhering to the reference white plate 119 is dust having a whiteness degree higher than that of the reference white plate 119 or dust causing specular reflection, the image processing ASIC 202 determines the pixel exceeding the determination threshold value as the dust. A result of the determination is output to the register of the image processing module of the image processing ASIC 202 as dust information (positional information including the width of the dust) in the line A.

The CPU 201 calculates the correction coefficient (singular point correction coefficient) at a dust (singular point) position identified in the processing of Step S805 (Step S806). This point is described in detail with reference to FIG. 10A and FIG. 10B.

Figure 10A:
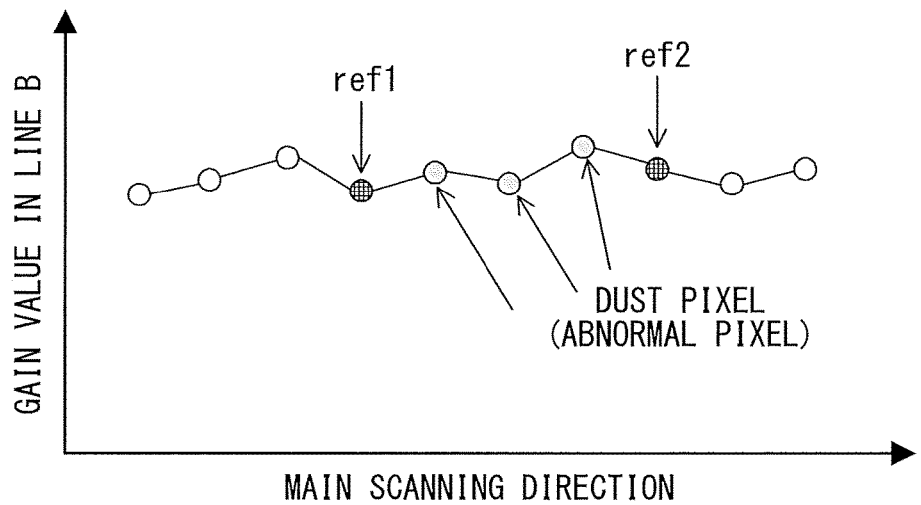
FIG. 10A and FIG. 10B are graphs for showing an example of calculation of a singular point correction coefficient.
Figure 10B:
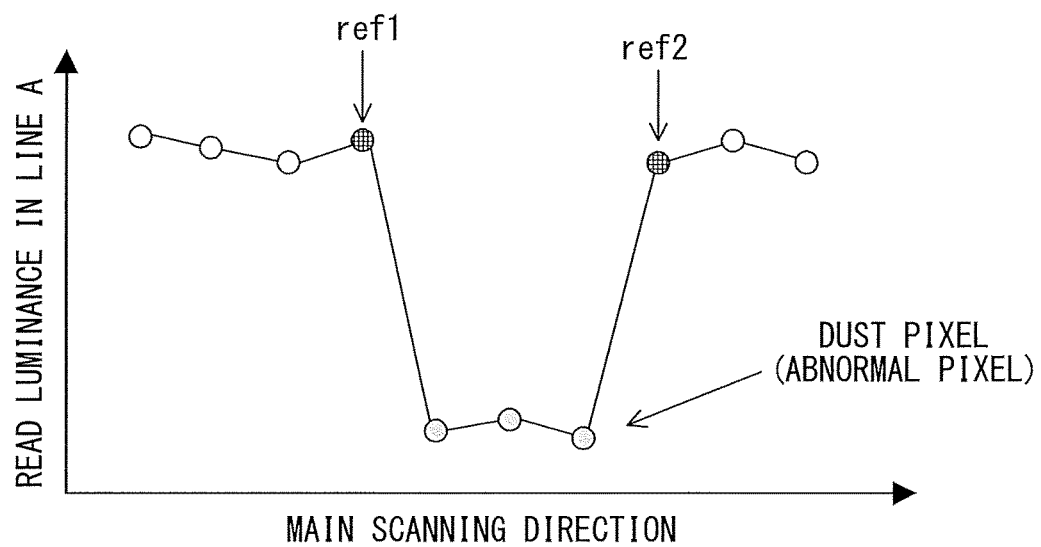

FIG. 10A and FIG. 10B are graphs for showing an example of calculation of the singular point correction coefficient. In the graph of FIG. 10A, the vertical axis represents the gain value in the line B, and the horizontal axis represents the main scanning direction. In the graph of FIG. 10B, the vertical axis represents the read luminance in the line A, and the horizontal axis represents the main scanning direction. As shown in FIG. 10A and FIG. 10B, the singular point correction coefficient can be calculated by Expression (7) with reference to normal pixels adjacent to the abnormal pixel, that is, adjacent to both ends of the abnormal pixel.

$$SPCC = SCC\_spp / (SCC\_ref1 + SCC\_ref2) \quad \text{Expression (7)}$$

SPCC: singular point correction coefficient,
SCC_spp: shading correction coefficient at singular point position
SCC_ref1: shading correction coefficient at ref1
SCC_ref2: shading correction coefficient at ref2

The CPU 201 causes the image processing ASIC 202 to obtain a sum of the shading correction coefficients corresponding to two reference pixel positions (ref1 and ref2) being normal pixels as illustrated in, for example, FIG. 10B. The image processing ASIC 202 divides the value of the shading correction coefficient corresponding to the position of the singular point by the value of the above-mentioned sum, to thereby be able to calculate the correction coefficient (singular point correction coefficient) at the singular point. The four pieces of information including the position of the abnormal pixel, the singular point correction coefficient, and the two reference pixel positions (ref1 and ref2) are stored in the SRAM 407 in association with one another for each abnormal pixel.

Figure 11:
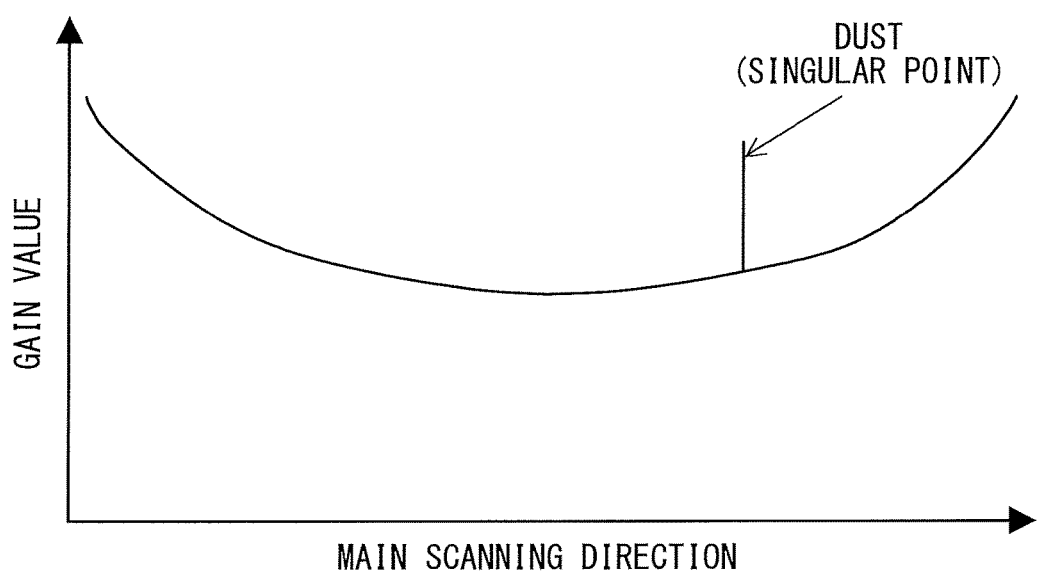
FIG. 11 is a graph for showing an example of the shading correction coefficient.

The description is continued with reference again to FIG. 7. The CPU 201 executes the sampling for reading the reference white plate 119 at the position of the line A (Step S807). The reading result is stored in the SRAM 407 as the reference white plate data for the line A by the image processing ASIC 202. The CPU 201 causes the image processing ASIC 202 to calculate the shading correction coefficient based on the data stored in the SRAM 407 in the processing of Step S807 (Step S808). A result of the calculation is stored in the SRAM 407 as a final shading correction coefficient. The dust 600 exists in the line A, and hence, in this case, a singular point occurs in the relevant shading correction coefficient as in the graph of FIG. 11 for showing an example of the shading correction coefficient. Therefore, the shading correction coefficient needs to be interpolated at the singular point position.

The CPU 201 calculates a singular point restoration coefficient for interpolating the correction coefficient at the singular point position among the final shading correction coefficients stored in the SRAM 407 in the processing of Step S808 (Step S809). Specifically, the CPU 201 causes the image processing ASIC 202 to read the pieces of data relating to the position of the abnormal pixel, the singular point correction coefficient, and the two reference pixel positions (ref1 and ref2) which are stored in the SRAM 407 in the processing of Step S806. The image processing ASIC 202 reads the shading correction coefficients corresponding to the two reference pixel positions (ref1 and ref2) from among the temporary shading correction coefficients stored in the SRAM 407 in the processing of Step S803. The image processing ASIC 202 calculates the singular point restoration coefficient based on those read pieces of information by Expression (8).

$$SPRC = SPCC \times (TSCC\_ref1 + TSCC\_ref2) \quad \text{Expression (8)}$$

SPRC: singular point restoration coefficient
SPCC: singular point correction coefficient
TSCC_ref1: temporary shading correction coefficient at ref1
TSCC_ref2: temporary shading correction coefficient at ref2

The image processing ASIC 202 stores the calculated singular point restoration coefficient in the SRAM 407 so that the calculated singular point restoration coefficient may be applied to the shading correction coefficient for the pixel corresponding to the singular point position. In this manner, correction processing for the shading correction coefficient for the abnormal pixel (dust pixel) is completed. An example of the result of the correction processing for the shading correction coefficient for the dust 600 (singular point) existing in the line A is described below with reference to FIG. 12A and FIG. 12B.

Figure 12A:
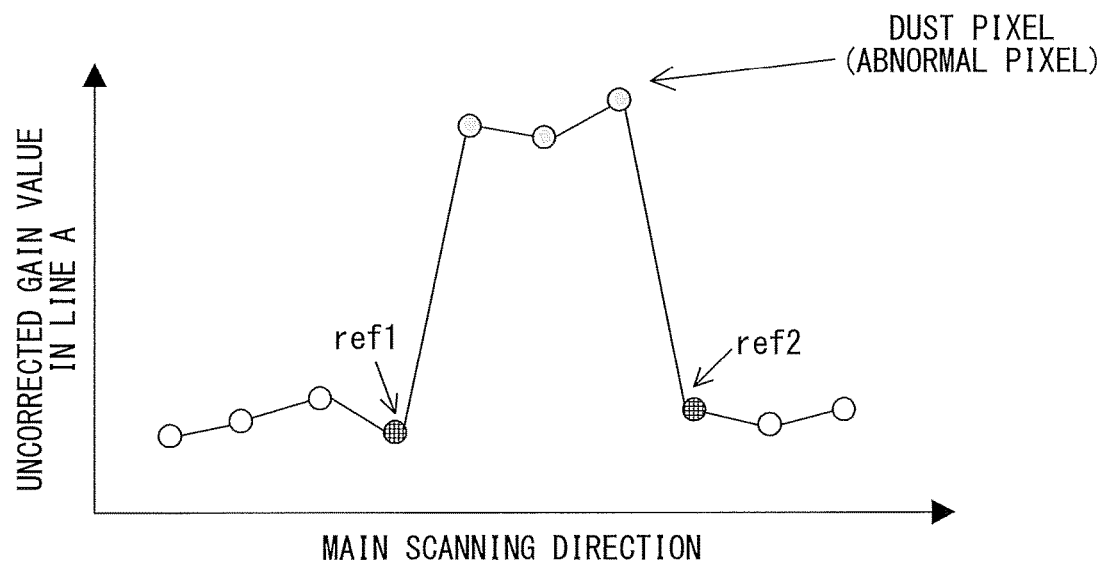
FIG. 12A is a graph for showing an uncorrected gain value of a dust pixel (abnormal pixel) in the line A.
Figure 12B:
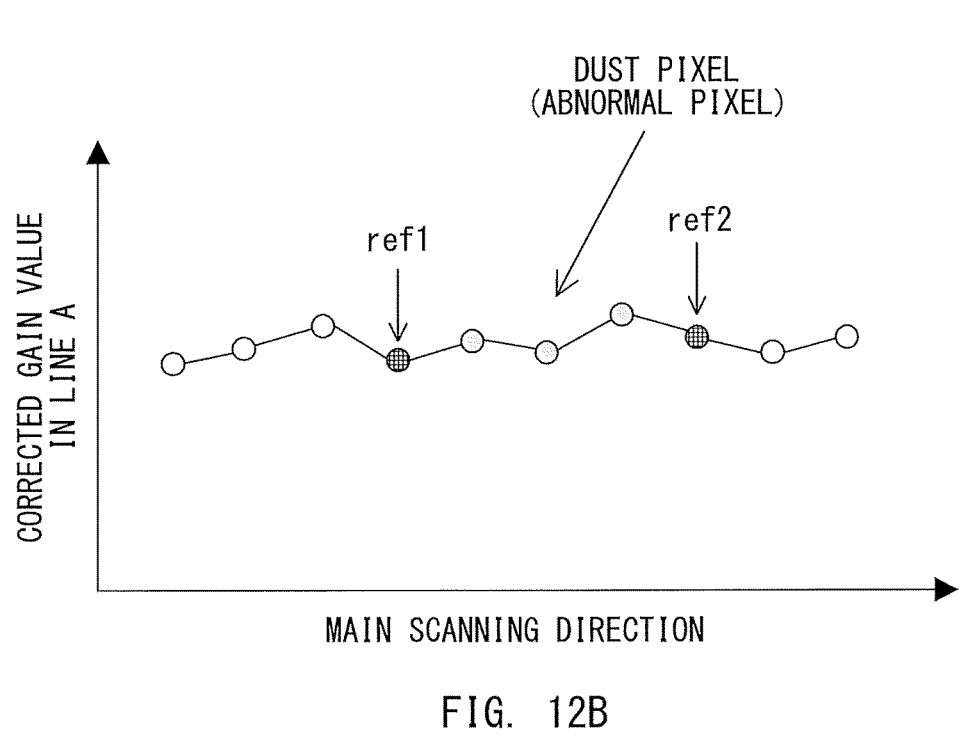
FIG. 12B is a graph for showing a corrected gain value thereof.

FIG. 12A is a graph for showing an uncorrected gain value of a dust pixel (abnormal pixel) in the line A, and FIG. 12B is a graph for showing a corrected gain value thereof. In the graph of FIG. 12A, the vertical axis represents the uncorrected gain value in the line A, and the horizontal axis represents the main scanning direction. In the graph of FIG. 12B, the vertical axis represents the corrected gain value in the line A, and the horizontal axis represents the main scanning direction.

The gain value of the dust pixel (abnormal pixel) is corrected by the above-mentioned processing of Step S809 so as to be changed from the value shown in the graph of FIG. 12A to the value shown in the graph of FIG. 12B. In this manner, the series of processing is repeatedly conducted for all the abnormal pixels, to thereby conduct the processing for detecting the dust 600 adhering to the reference white plate 119 and the correction processing for the read image.

As described above, the image reading apparatus 100 includes the color filters having a staggered array configuration. Therefore, in a case where sort processing is performed on the read data in the image processing ASIC 202 such that the pixels of the same color are adjacent each other, a pixel which is determined to be the dust pixel is divided into pixels of a plurality of colors. In this case, a time period required for the detection and correction thereof is longer than a case of the reading sensor including color filters having each line formed of the same color, and increases in proportion to the width of a detected piece of dust and the number of detected pieces of dust.

The increase in number of detected pieces of dust causes an increase in consumption amount of a memory area of the SRAM 407 for storing the dust information, and proportionally causes an increase in time period required for correction processing therefor as well. In view of the foregoing, the image reading apparatus 100 according to the first embodiment is configured to conduct processing for performing a logical OR operation on a dust flag being a dust detection result among a plurality of colors, to thereby restore the dust flag separated into the respective colors to a state before the separation. This point is described with reference to FIG. 13 and FIG. 14.

Figure 13:
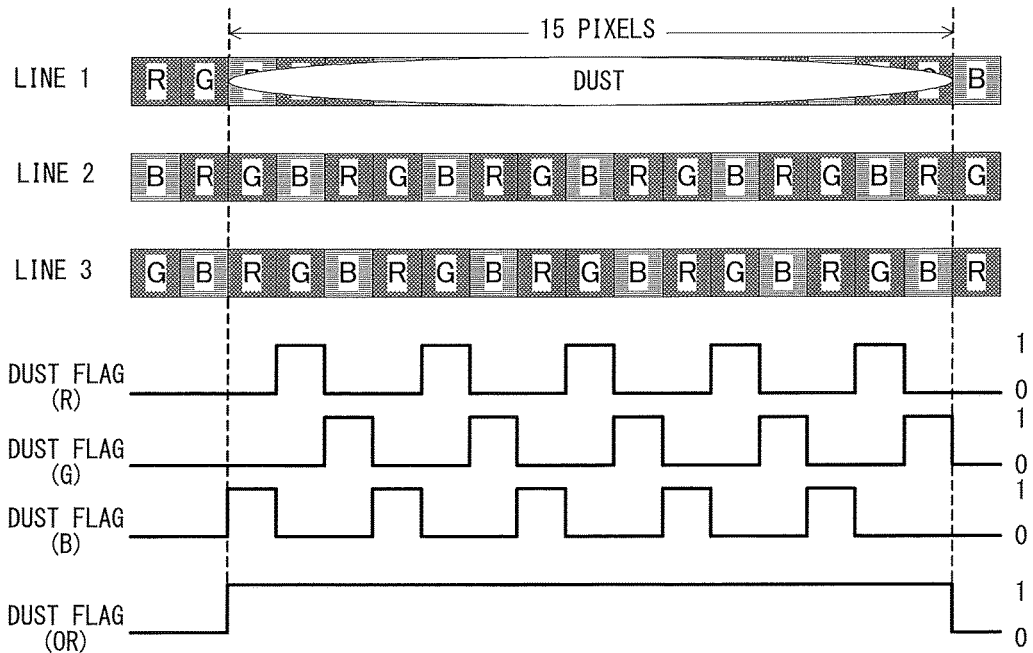
FIG. 13 is a schematic diagram for illustrating how a dust flag appears when dust having a fifteen-pixel width adheres to one line sensor.

FIG. 13 is a schematic diagram for illustrating how a dust flag appears when dust having a fifteen-pixel width adheres to one line sensor. As illustrated in FIG. 13, from the viewpoint of the respective colors of R, G, and B, the dust is expressed as dust flags (R), (G), and (B) each having a one-pixel width, which appear in units of one pixel, that is, cyclically. In contrast, with a dust flag (OR) subjected to the logical OR operation, the dust is expressed as one dust flag (abnormal pixel) having a fifteen-pixel width.

Figure 14:
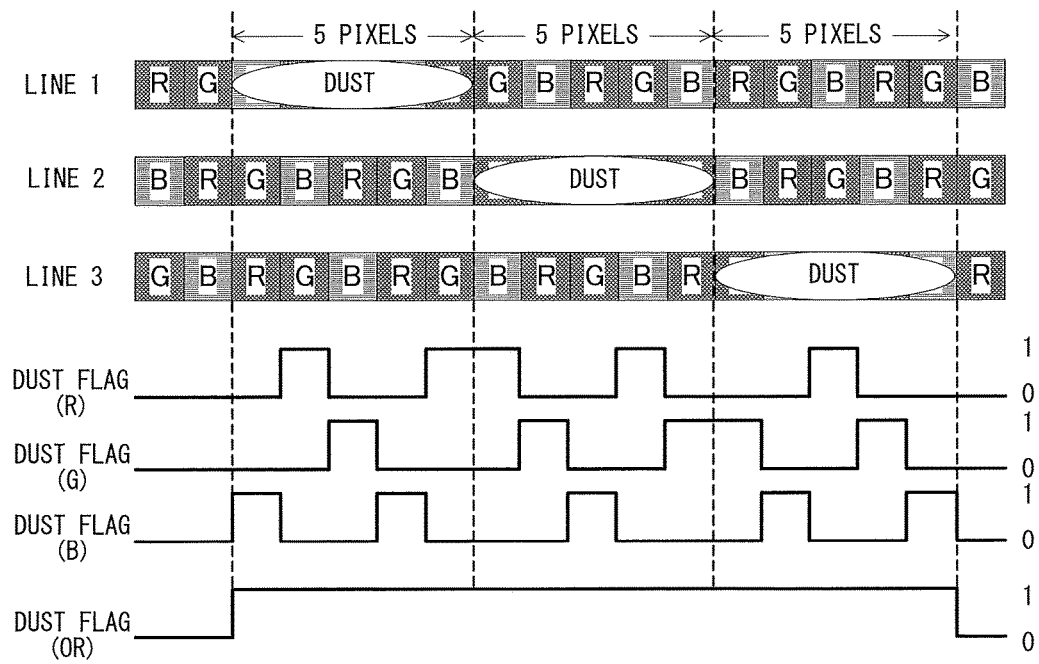
FIG. 14 is a schematic diagram for illustrating how the dust flag appears when pieces of dust having a five-pixel width adhere to three line sensors over the respective lines.

FIG. 14 is a schematic diagram for illustrating how the dust flag appears when pieces of dust having a five-pixel width adheres to three line sensors over the respective lines. In the same manner as in the case illustrated in FIG. 13, from the viewpoint of the respective colors of R, G, and B, the pieces of dust appear at given intervals as the dust flags (R), (G), and (B). In contrast, with the dust flag (OR) subjected to the logical OR operation, the pieces of dust appear as one dust flag having a fifteen-pixel width, that is, one piece of dust.

In this manner, the image reading apparatus 100 is configured to conduct the processing for detecting the dust (singular point determination processing of Step S806 illustrated in FIG. 7) on the dust flag (OR) subjected to the logical OR operation among the colors of R, G, and B. With this configuration, a plurality of abnormal pixels identified for the respective colors can be identified as one abnormal pixel. Therefore, a processing time period relating to the dust detection or the like can be prevented from increasing effectively.

Second Embodiment

In the first embodiment, the dust flag (OR) subjected to the logical OR operation is generated at each of a sheet interval and a leading edge of the original. However, this processing may weaken the meaning of separating a dust streak by employing the reading sensor having such a color filter configuration as illustrated in FIG. 3. An image reading apparatus according to a second embodiment of the present invention has a function of conducting processing (hereinafter referred to as "extension processing") for extending the width of the dust flag being the result of detecting the dust to restore the dust flag separated into the respective colors to the state before the separation on the whole. The singular point determination in this embodiment differs from the singular point determination in Step S805 of the first embodiment. The same components as those of the first embodiment are denoted by like reference symbols, and descriptions thereof are omitted.

For example, a pixel adjacent to the pixel involving the appearance of the dust flag, which is supposed to be recognized as dust, may fail to be determined as dust depending on a state under which dust adheres to the reference white plate 119 or 129 or depending on how the determination threshold value is set for dust. In such a case, a part of the dust is used as a reference at a time of the correction, which may lower the reliability of the shading correction coefficient.

In order to reduce such a risk, the image processing ASIC 202 conducts the extension processing on the dust flag so that pixels adjacent to the pixel (dust pixel) involving the appearance of the dust flag (that is, one pixel adjacent to the dust pixel on the left and one pixel adjacent to the dust pixel on the right) are also recognized as the dust flags. The extension processing for the dust flag is applied to the dust flag detected by the reading sensor having a color filter configuration of a staggered arrangement, to thereby be able to apparently restore the separated dust flag to the state before the separation on the whole.

Figure 15:
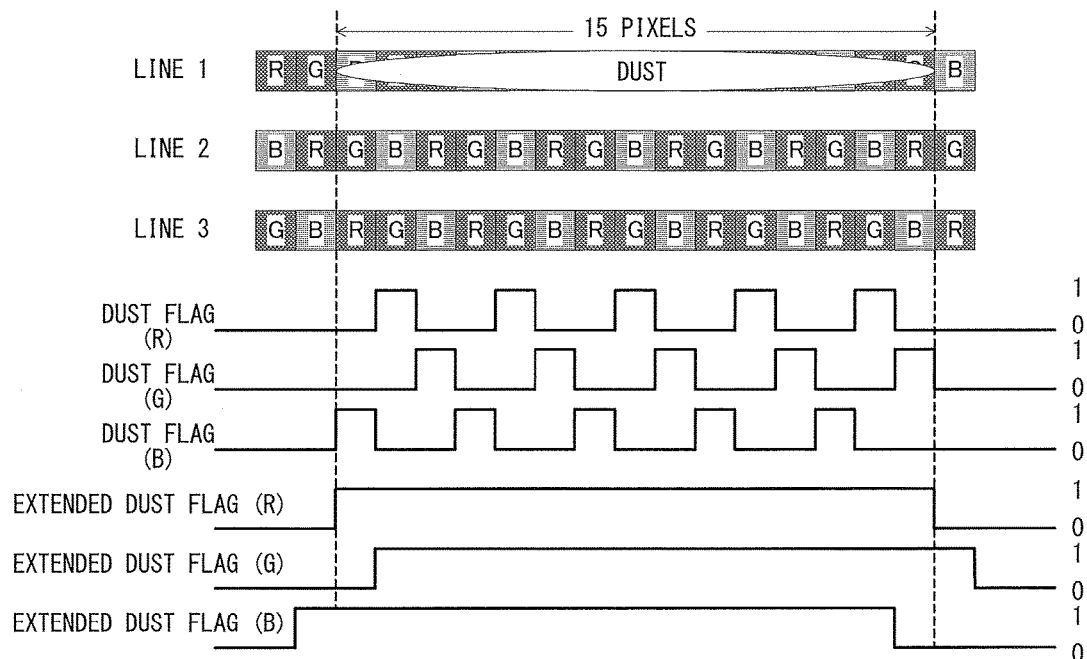
FIG. 15 is a schematic diagram for illustrating how a dust flag appears when dust having a fifteen-pixel width adheres to one line sensor of an image reading apparatus according to a second embodiment of the present invention.

FIG. 15 is a schematic diagram for illustrating how a dust flag appears when dust having a fifteen-pixel width adheres to one line sensor. Similarly to FIG. 13, from the viewpoint of the respective colors of R, G, and B, the dust is expressed as dust flags (R), (G), and (B) each having a one-pixel width, which appear in units of one pixel, that is, cyclically. In contrast, with extended dust flags (R), (G), and (B) subjected to the extension processing, the dust is expressed as one dust flag having a fifteen-pixel width.

Figure 16:
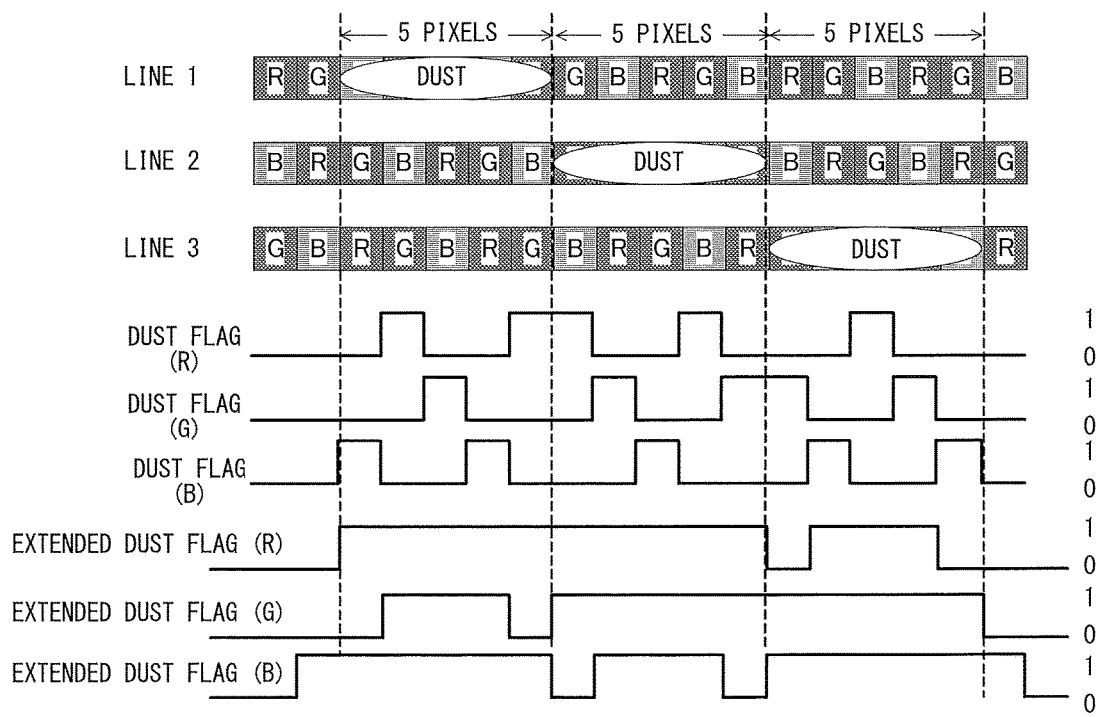
FIG. 16 is a schematic diagram for illustrating how the dust flag appears when pieces of dust having a five-pixel width adhere to three line sensors over the respective lines.
Figure 17:
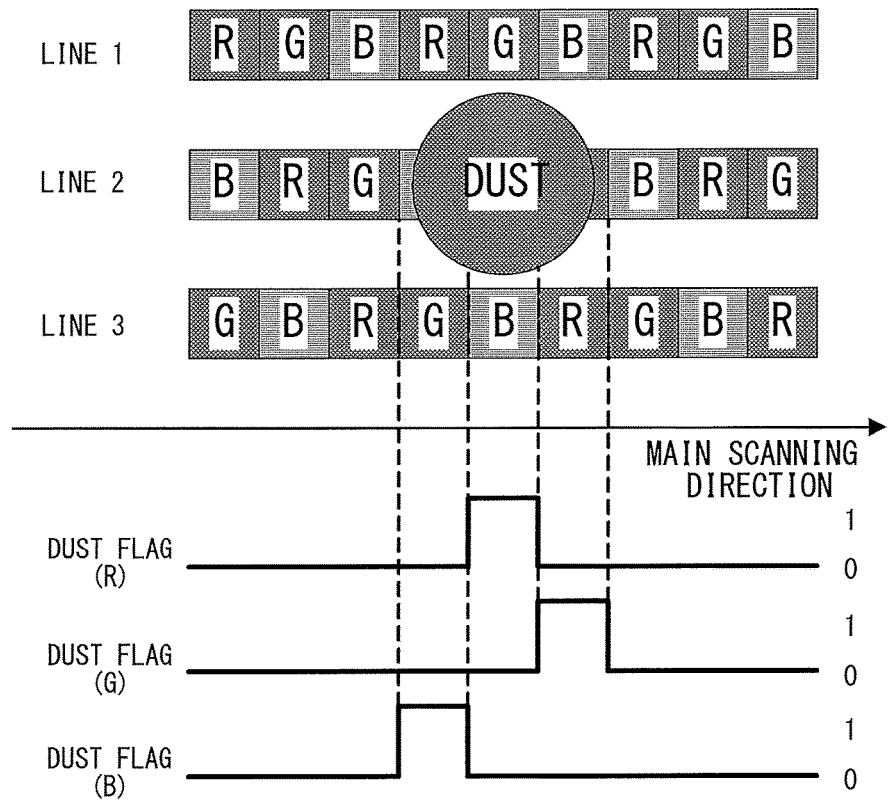
FIG. 17 is a diagram for illustrating an example of dust detection conducted by a related-art reading sensor having a staggered arrangement.
Figure 18:
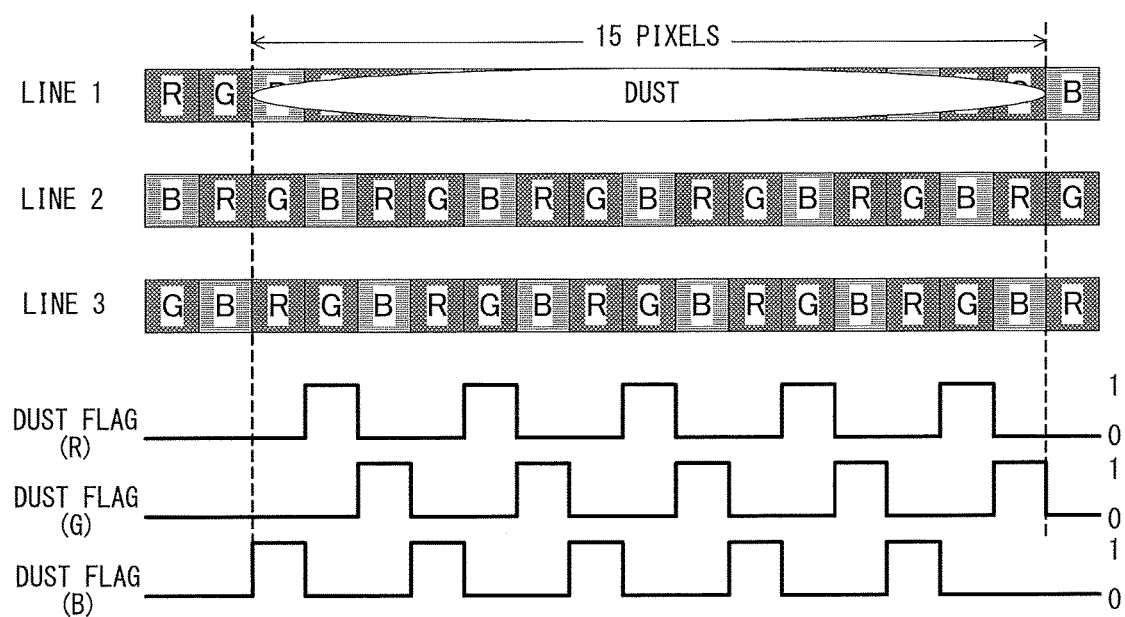
FIG. 18 is a diagram for illustrating an example of dust detection conducted by a related-art reading sensor having a staggered arrangement, which is different from that of FIG. 17.

FIG. 16 is a schematic diagram for illustrating how the dust flag appears when pieces of dust having a five-pixel width adheres to three line sensors over the respective lines. In the same manner as in the case illustrated in FIG. 15, from the simple viewpoint of the respective colors of R, G, and B, the pieces of dust appear at given intervals as the dust flags (R), (G), and (B). In contrast, with the extended dust flags (R), (G), and (B) subjected to the extension processing, the pieces of dust appear as one dust flag having a width of three to ten pixels.

In the example illustrated in FIG. 16, unlike in the example illustrated in FIG. 15, the dust is not identified as one dust flag having a fifteen-pixel width, but a detection amount thereof can be reduced to the number of detected pieces of dust half or smaller than the number obtained in a case where the extension processing is not conducted. With this configuration, the processing time period relating to the dust detection or the like can be suppressed more effectively.

As described in the above, according to the present invention, a time period required for detection of dust and interpolation processing for a result of the detection can be reduced even by the image reading apparatus including the reading sensor obtained by arranging the color filters for at least two colors in one line.

The above-described embodiments are given just for the purpose of describing the present invention more specifically, and the scope of the present invention is not limited by the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110142, filed Jun. 1, 2016 which is hereby incorporated by reference herein in its entirety.

What is claimed is:

1. An image reading apparatus, comprising:
a reading unit having a first line sensor and a second line sensor, each line sensor having a plurality of light receiving elements receiving light of a first color and a plurality of light receiving elements receiving light of a second color that is different from the first color, the light receiving elements being arranged along a first direction, the line sensors being arranged along a second direction orthogonal to the first direction, and the reading unit is configured to read an image of a target object at a reading position;
a processor; and
at least one memory, the processor operating to:
derive correction data for shading correction based on output from the first line sensor and the second line sensor having read a reference white plate,
detect an abnormal pixel based on output from the first line sensor and the second line sensor having read a reference white plate,
generate abnormal pixel information by combining detected results of the abnormal pixel detector, and
interpolate the correction data for a portion corresponding to the abnormal pixel based on a pixel adjacent to a region represented by the generated abnormal pixel information in the first direction,
wherein the processor performs a logical OR operation on first abnormal pixel information and second abnormal pixel information, and
wherein the first abnormal pixel information represents a position of a first abnormal pixel indicating the abnormal pixel for the first color in the first direction, and the second abnormal pixel information represents a position of the second abnormal pixel indicating the abnormal pixel for the second color in the first direction.

2. The image reading apparatus according to claim 1, wherein the processor detects the abnormal pixel by comparing read data read by the reading unit with a threshold value.

3. The image reading apparatus according to claim 1, wherein the processor interpolates, in a case where abnormal pixels continuously extend in the first direction, the correction data for a portion corresponding to the abnormal pixels based on pixels adjacent to both sides of the continuously extending abnormal pixels.

4. The image reading apparatus according to claim 1, wherein in each of the first and second line sensors, the light receiving elements which receive light of the same color are prevented from being adjacent to each other in the second direction.

5. A reading method for an image reading apparatus comprising a reading unit, the reading unit having a first line sensor and a second line sensor, each line sensor having a plurality of light receiving elements receiving light of a first color and a plurality of light receiving elements receiving light of a second color that is different from the first color, the light receiving elements being arranged along a first direction, the line sensors being arranged along a second direction orthogonal to the first direction, and the reading unit is configured to read an image of a target object at a reading position, the reading method comprising:
deriving correction data for shading correction based on output from the first line sensor and the second line sensor having read a reference white plate;
detecting an abnormal pixel, based on output from the first line sensor and the second line sensor having read a reference white plate;
generating abnormal pixel information by combining detected results of the abnormal pixel detector;
interpolating the correction data for a portion corresponding to the abnormal pixel based on a pixel adjacent to a region represented by the generated abnormal pixel information in the first direction; and
performing a logical OR operation on first abnormal pixel information and second abnormal pixel information,
wherein the first abnormal pixel information represents a position of a first abnormal pixel indicating the abnormal pixel for the first color in the first direction, and the second abnormal pixel information represents a position of the second abnormal pixel indicating the abnormal pixel for the second color in the first direction.

6. An image forming apparatus comprising:
a reading unit having a first line sensor and a second line sensor, each line sensor having a plurality of light receiving elements receiving light of a first color and a plurality of light receiving elements receiving light of a second color that is different from the first color, the light receiving elements being arranged along a first direction, the line sensors being arranged along a second direction orthogonal to the first direction, and the reading unit is configured to read an image of a target object at a reading position;

an image forming unit configured to form an image on a recording medium based on read data read by the reading unit;

a processor; and at least one memory, the processor operating to:
- derive correction data for shading correction based on output from the first line sensor and the second line sensor having read a reference white plate,
- detect an abnormal pixel based on output from the first line sensor and the second line sensor having read a reference white plate,
- generate abnormal pixel information by combining detected results of the abnormal pixel detector, and
- interpolate the correction data for a portion corresponding to the abnormal pixel based on a pixel adjacent to a region represented by the generated abnormal pixel information in the first direction, wherein the processor performs a logical OR operation on first abnormal pixel information and second abnormal pixel information, and wherein the first abnormal pixel information represents a position of a first abnormal pixel indicating the abnormal pixel for the first color in the first direction, and the second abnormal pixel information represents a position of the second abnormal pixel indicating the abnormal pixel for the second color in the first direction.

7. An image reading apparatus, comprising:

a reading unit having a first line sensor and a second line sensor, each line sensor having a plurality of light receiving elements receiving light of a first color and a plurality of light receiving elements receiving light of a second color that is different from the first color, the light receiving elements being arranged along a first direction, the line sensors being arranged along a second direction orthogonal to the first direction, and the reading unit is configured to read an image of a target object at a reading position;

an image forming unit configured to form an image on a recording medium based on read data read by the reading unit;

a processor; and at least one memory, the processor operating to:
- derive correction data for shading correction based on output from the first line sensor and the second line sensor having read a reference white plate,
- detect an abnormal pixel based on output from the first line sensor and the second line sensor having read a reference white plate,
- generate abnormal pixel information by combining detected results of the abnormal pixel detector, and
- interpolate the correction data for a portion corresponding to the abnormal pixel based on a pixel adjacent to a region represented by the generated abnormal pixel information in the first direction, wherein the processor performs a logical OR operation on first abnormal pixel information and second abnormal pixel information, and wherein the first abnormal pixel information represents a position of a first abnormal pixel indicating the abnormal pixel for the first color in the first direction, and the second abnormal pixel information represents a position of the second abnormal pixel indicating the abnormal pixel for the second color in the first direction.

8. An image reading apparatus, comprising:

a reading unit having a first line sensor and a second line sensor, each line sensor having a plurality of light receiving elements receiving light of a first color and a plurality of light receiving elements receiving light of a second color that is different from the first color, the light receiving elements being arranged along a first direction, the line sensors being arranged along a second direction orthogonal to the first direction, and the reading unit is configured to read an image of a target object at a reading position;

a processor; and at least one memory, the processor operating to:
- derive correction data for shading correction based on output from the first line sensor and the second line sensor having read a reference white plate,
- detect an abnormal pixel based on output from the first line sensor and the second line sensor having read a reference white plate,
- generate abnormal pixel information by combining detected results of the abnormal pixel detector, and
- interpolate the correction data for a portion corresponding to the abnormal pixel based on a pixel adjacent to a region represented by the generated abnormal pixel information in the first direction, wherein the processor generates the abnormal pixel information by combining a detected result of each pixel of the first line sensor with a detected result of each pixel of the second line sensor that is located in a same position in the first direction of each pixel.

9. The image reading apparatus according to claim 8, wherein the processor detects the abnormal pixel by comparing read data read by the reading unit with a threshold value.

10. The image reading apparatus according to claim 8, wherein the processor interpolates, in a case where abnormal pixels continuously extend in the first direction, the correction data for a portion corresponding to the abnormal pixels based on pixels adjacent to both sides of the continuously extending abnormal pixels.

11. The image reading apparatus according to claim 8, wherein in each of the first and second line sensors, the light receiving elements which receive light of the same color are prevented from being adjacent to each other in the second direction.

* * * * *